United States Patent

Jonsson

[11] Patent Number: 5,966,660
[45] Date of Patent: *Oct. 12, 1999

[54] USER CONTROLLED CALL SETUP THROUGH MANUAL SWITCHBOARD

[75] Inventor: Björn Jonsson, Jäfälla, Sweden

[73] Assignee: Telefonaktiebolaget L/M Ericsson (publ), Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/864,663

[22] Filed: May 28, 1997

[51] Int. Cl.⁶ ............................................. H04M 3/50
[52] U.S. Cl. .................. 455/445; 455/414; 455/417; 455/554; 379/210
[58] Field of Search ........................... 455/445, 414, 455/554, 555, 406, 422, 416, 417; 379/210, 211, 212

[56] References Cited

U.S. PATENT DOCUMENTS

| | | | |
|---|---|---|---|
| 4,819,262 | 4/1989 | Brittain et al. | 379/157 |
| 5,313,458 | 5/1994 | Suzuki | 370/56 |
| 5,386,464 | 1/1995 | Pruitt | 379/201 |
| 5,438,616 | 8/1995 | Peoples | 379/201 |
| 5,533,114 | 7/1996 | Ballard et al. | 379/220 |
| 5,539,807 | 7/1996 | Ghisler et al. | 455/414 |
| 5,550,909 | 8/1996 | Chanda et al. | 379/220 |
| 5,555,553 | 9/1996 | Jonsson | 379/214 |
| 5,563,939 | 10/1996 | La Porta et al. | 379/220 |
| 5,566,236 | 10/1996 | MeLampy et al. | 379/201 |
| 5,577,113 | 11/1996 | Bray et al. | 379/220 |
| 5,579,385 | 11/1996 | Wille et al. | 379/221 |
| 5,631,904 | 5/1997 | Fitser et al. | 370/261 |
| 5,708,697 | 1/1998 | Fischer et al. | 379/61 |
| 5,710,809 | 1/1998 | Mashisky | 379/201 |
| 5,719,919 | 2/1998 | Grecco et al. | 379/67 |
| 5,719,925 | 2/1998 | Peoples | 379/201 |

FOREIGN PATENT DOCUMENTS

| | | |
|---|---|---|
| 2 294 179 | 4/1996 | United Kingdom . |
| WO 93/22866 | 11/1993 | WIPO . |
| WO 97/13352 | 4/1997 | WIPO ............ H04M 3/50 |

*Primary Examiner*—Nguyen Vo
*Assistant Examiner*—Duc Nguyen
*Attorney, Agent, or Firm*—Jenkens & Gilchrist, P.C.

[57] ABSTRACT

A subscriber associated with a private branch exchange (PBX) terminal without a Direct-Inward-Dialing (DID) line establishes a first call connection with a particular service node via a mobile station. The subscriber then instructs the service node to originate a second call connection from the service node towards the PBX serving said subscriber. The first and second call connections are interfaced to enable the subscriber to communicate with a PBX operator answering the second call connection. The subscriber then instructs the operator to forward the received call to the subscriber's PBX terminal. Thereafter, the subscriber instructs the service node to originate a third call connection towards a particular called party terminal. The established third call connection is interfaced with the second call connection to enable the subscriber to communicate with the called party subscriber terminal via the PBX terminal. The first call connection with the mobile station is terminated. Since no outgoing call connection has been originated by the PBX, no additional PBX associated charges are incurred by the subscriber for the communication.

23 Claims, 4 Drawing Sheets

USER CONTROLLED CALL SETUP THROUGH MANUAL SWITCHBOARD

BACKGROUND OF THE INVENTION

1. Technical Field of the Invention

The present invention relates to a telecommunications network and, in particular, to the effectuation of a call connection through a manual switchboard within such a network.

2. Description of Related Art

With the advent of long distance calling cards, toll-free "800" numbers, and associated subscriber features, traveling subscribers are able to utilize their existing subscriber data, such as speed dialing lists, subscriber features, subscription record for billing purposes, etc., while utilizing a remote terminal associated with a visited telecommunications exchange. As an illustration, a subscriber located remotely from the subscriber's terminal is able to dial an access number, such as a toll-free number, identify the subscriber's account number via dual tone multi-frequency (DTMF) transmission, and originate a long distance call connection towards a called party subscriber and still have the incurred long distance charges be billed to the subscriber's existing subscription. Such a capability is especially convenient for traveling salespersons or business persons who need to be in constant contact with their offices and associates.

However, even with the above described capabilities, there still remains a disadvantage for subscribers utilizing private branch exchanges (PBXs). Most PBXs associated with hotels, for example, charge their hotel guests for making outgoing call connections regardless of whether the guests are using their own long distance service or not. Furthermore, some hotels charge not only on a per call basis but also for the duration of the outgoing call connection made by hotel guests. Furthermore, with a wide proliferation of personal computers and fax machines, hotel guests are then forced to incur unreasonable charges for effectuating long lasting data communications or connections via hotel PBXs.

Even with the wide usage of mobile stations, the above described inefficiency is not completely solved. Due to expensive air-time charges and unreliable battery-life time, most subscribers prefer to use a wireline terminal if such a terminal is readily available. Furthermore, for data communications, such as a modem connection, a more desirable bandwidth and connection quality can be achieved via a wireline connection.

As a result, there is a need for a mechanism to enable a traveling subscriber to effectuate a speech or data call connection without incurring additional charges associated with a serving PBX.

SUMMARY OF THE INVENTION

The present invention discloses a method and apparatus for enabling a subscriber to instruct a service node via a mobile station to effectuate a call connection between a private branch exchange (PBX) terminal and a called party subscriber terminal without incurring additional PBX associated outgoing call charges. A subscriber originates a call connection from a mobile station towards a service node associated with a telecommunications network. An indication is then transmitted over the established call connection to instruct the service node to originate a first outgoing call connection towards a particular private branch exchange serving a PBX terminal. In response to the established first outgoing call connection being answered by an operator associated with said PBX, the operator is then instructed through the mobile station to forward the call to said PBX terminal. As a result, a call connection between the PBX terminal and the service node is established. The service node is thereafter instructed to originate a second outgoing call connection towards a particular called party subscriber terminal. In response to a successful call connection, the first outgoing call connection and the second outgoing call connection are interfaced to establish a call connection between the PBX terminal and the called party subscriber terminal. The incoming call connection from the mobile station is then disconnected.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
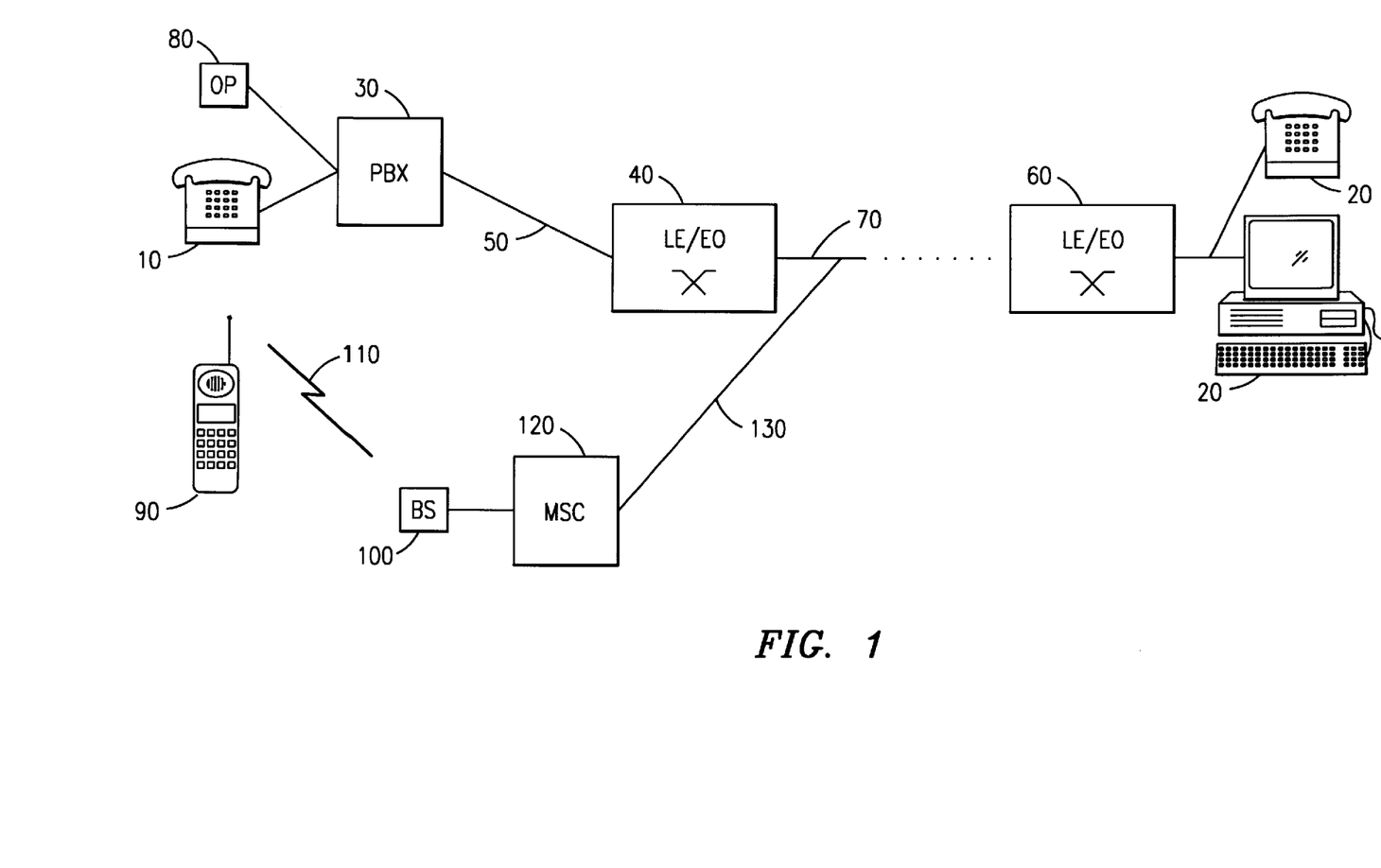
FIG. 1 is a block diagram of a telecommunications network illustrating a call connection between a private branch exchange (PBX) terminal and a Public Switched Telephone Network (PSTN) terminal.

FIG. 1 is a block diagram of a telecommunications network illustrating a call connection between a private branch exchange (PBX) terminal 10 and a Public Switched Telephone Network (PSTN) terminal 20. A private branch exchange (PBX) 30 associated with a company or hotel, for example, serves a number of PBX terminals 10 with the same prefix. As a result, PBX terminals 10 connected to the same PBX 30 can effectuate an intra-PBX call connection by merely dialing, for example, the last four digits of the called party directory number. To call outside of the associated PBX 30, a subscriber utilizing a PBX terminal 10 usually has to dial "9" or an access code to gain access to an outside line and to dial a called party directory number associated with a particular called party subscriber. As an illustration, a PBX subscriber has to dial "9" to request a second dial tone and to dial a called party directory number associated with the PSTN terminal 20 to effectuate a call connection therebetween. As a result, a first call connection 50 between the PBX 30 and a first local exchange (LE) or end office (EO) 40 serving the PBX 30 is established. The first LE 40 then evaluates the called party directory number (CdPn) and properly routes the call setup signal to a second LE 60 associated with the called party PSTN terminal 20. As a result, a call connection 70 between the first LE 40 and the second LE 60 is established enabling the PBX terminal 10 and the PSTN terminal 20 to communicate voice and/or data therebetween. For exemplary purposes, a direct trunk or circuit connection 70 is established between the first LE 40 and the second LE 60. However, it is to be understood that a number of signal transfer points (STPs), tandem switches, and other local exchanges may be needed to effectuate a circuit connection between the originating and terminating local exchanges. Furthermore, the PBX 30 may also connect to a serving telecommunications network directly without being served by another local exchange 40.

To effectuate an incoming call connection from an outside subscriber terminal towards the PBX terminal 10, two different methods can be performed. For a PBX 30 with Direct-Inward-Dialing (DID) capabilities, an outside subscriber terminal, such as the PSTN terminal 20, can dial a directory number associated with the PBX terminal 10 and an incoming call connection is directly effectuated between the PSTN terminal 20 and the PBX terminal 10. Alternatively, for a PBX 30 without DID capabilities, the PSTN terminal 20 has to first dial a directory number associated with the PBX 30. The call connection is then initially answered by an operator 80 or answering system, and upon providing necessary information, forwarded to the indicated PBX terminal 10.

As fully described above, utilizing PBX associated terminals, such as hotel PBXs, is not always the best and/or most economical way for a subscriber to originate a call connection. Hotel guests are usually required to pay additional charges for effectuating an outgoing call connection via a hotel PBX. Such charges may further increase with the duration of effectuated call connections.

A subscriber may avoid such PBX associated additional charges by utilizing the subscriber's mobile station 90. As an illustration, in order to effectuate an outgoing call connection, the mobile station 90 communicates with a particular base station (BS) 100 providing coverage over the relevant geographic location by way of a radio link 110 and requests a serving mobile switching center (MSC) 120 to transmit a call setup signal, such as an Initial Address Message (IAM), towards the calling party PSTN subscriber terminal 20. In a similar manner as described above for establishing a call connection between two wireline end offices, a trunk or circuit connection 130 is similarly established between the serving MSC 120 and the second local exchange 60 serving the PSTN terminal 20. Having a favorable subscription agreement with a serving mobile service provider, the traveling subscriber may be able to effectuate a more economical call connection.

However, because of the bandwidth limitations imposed by the effectuated radio link 110 and a battery life duration associated with the stand-alone mobile station 90, establishing a long lasting communications link with a mobile telecommunications network is not always reliable or desirable.

Figure 2:
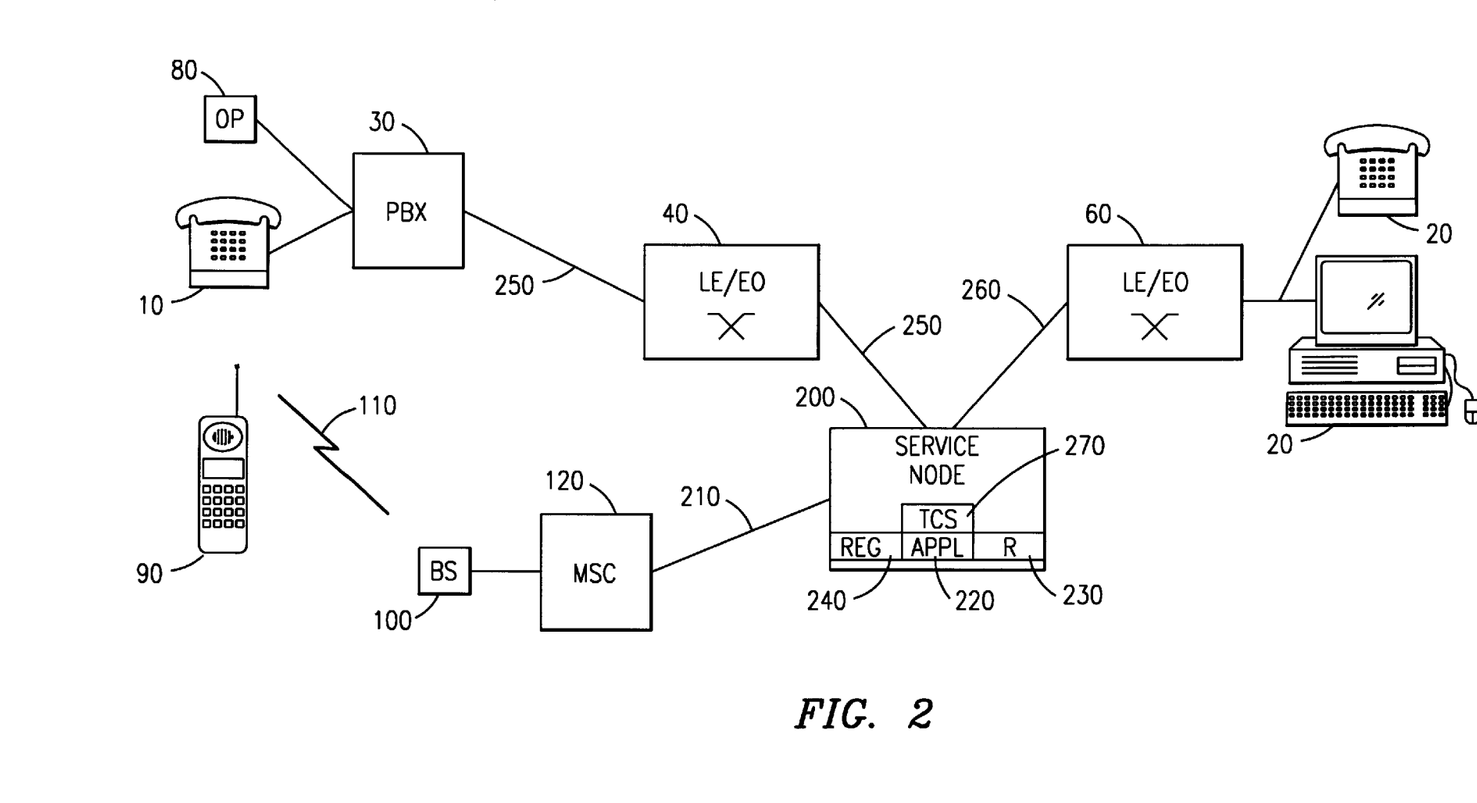
FIG. 2 is a block diagram of a telecommunications network illustrating a call connection between a PBX terminal and a PSTN terminal in accordance with the teachings of the present invention.

FIG. 2 is a block diagram of a telecommunications network illustrating a call connection between a PBX terminal 10 and a PSTN terminal 20 in accordance with the teachings of the present invention. A hotel guest associated with a hotel PBX 30 and having access to a mobile station 90 originates an outgoing call connection towards a particular service node 200 via the mobile station 90. Accordingly, a radio call setup signal is transmitted by the mobile station 90 and received by the serving MSC 120 through the BS 100. The serving MSC 120 then transmits a network call setup signal over a connected telecommunications network, such as a Signaling System No. 7 (SS7) telecommunications network, towards the indicated service node 200 and establishes a first circuit connection 210 therebetween. As a result, a call connection between the mobile station 90 and the service node 200 is effectuated. An application module 220 associated with the service node 200 then authenticates the mobile subscriber by requesting and receiving, if necessary, certain information therefrom. The application module 220 then requests a directory number associated with the PBX 30. The mobile subscriber then provides the requested information, such as the directory number associated with the hotel operator, over the radio link 110. Such information can be transmitted using dual tone multi-frequency (DTMF) signals, voice data, or unstructured data messages. Such unstructured data messages, for example, include short message service (SMS), unstructured supplementary service data (USSD), and general packet radio service (GPRS) messages. Such transmitted data are then analyzed by a recognizer 240 comprising a DTMF receiver, voice recognizer, USSD handler, SMS receiver, and/or GPRS receiver associated with the application module 220. The application module 220 then instructs an associated traffic control system (TCS) 270 to transmit another network call setup signal towards the PBX 30. As a result, a second circuit connection 250 between the service node 200 and the PBX 30 is effectuated. The effectuated second circuit connection 250 is then interfaced or connected with the first circuit connection 210 originated by the mobile station 90.

Assuming that the PBX 30 does not have DID capabilities, an operator or answering system 80 associated with the PBX 30 initially answers the incoming call connection 250. Since the second circuit or call connection 250 is further connected to the first circuit connection 210, the mobile subscriber is able to instruct the operator 80 to transfer or forward the call connection to the PBX terminal 10. Such an instruction may be performed orally or via DTMF signals transmitted from the mobile station 90. As a result, the PBX terminal (hotel room terminal) 10 associated with the mobile subscriber is alerted (rung) and a call connection between the PBX terminal 10 and the service node 200 is established. Since the call connection 250 to the PBX terminal 10 is an incoming call connection as far as the PBX 30 is concerned, no additional PBX associated charges are levied against the subscriber.

The service node 200 then needs to connect the PBX terminal 10 with the called party subscriber terminal 20. There are basically two different ways of effectuating such a call connection. First, the subscriber instructs the application module 220 to originate yet another outgoing call connection towards the PSTN terminal 20 by transmitting such instruction data over the first circuit connection 210. As described above, utilizing DTMF, voice, or unstructured data, the mobile subscriber is able to provide the application module 220 with a particular directory number. Alternatively, the application module may retrieve a directory number from an associated register (R) 230 and originate a call connection therewith. As an illustration, the mobile subscriber may specify a speed code or service code. In response, the application module 220 retrieves the associated directory number from the register (R) 230 and originates a call setup signal with the retrieved directory number as the called party directory number over the connected SS7 telecommunications network. As a result, a third circuit connection 260 from the service node 200 to the PSTN terminal 20 is established. The application module 220 then connects the third circuit connection 260 with the second circuit connection 250 and enables the PBX terminal 10 to communicate with the PSTN terminal 20. The first circuit connection 210 and the established radio link 110 are terminated in response to a successful call connection between the PBX terminal 10 and the PSTN terminal 20. As a result, a call connection between the PBX terminal 10 and the PSTN terminal 20, for example, is established without incurring PBX associated additional charges for the traveling subscriber.

As another embodiment of the present invention, instead of utilizing the mobile station 90 to instruct the service node to originate a call connection towards the PSTN terminal 20, the subscriber provides such information via the PBX terminal 10 over the second circuit connection 250. The application module 220 then collects the information received over the second circuit connection 250, analyzes the received data using an appropriate device or module, such as the recognizer 240, and instructs the TCS 270 to transmits a call setup signal towards the indicated PSTN terminal 20. As a result, a call connection between the PBX terminal 10 and the PSTN terminal 20 is established.

The application module 220 associated with the service node 200 further monitors communications being effectuated over the established second and third circuit connections. When the PBX terminal 10 transmits a particular signal, such as a hook-flash, DTMF signals, etc., the application module 220 detects the signal and performs appropriate actions associated therewith. As an illustration, the PBX subscriber may enter a particular DTMF signal to disconnect the call connection 260 with the PSTN terminal 20 and to establish a new call connection with another called party subscriber terminal.

When the PSTN terminal 20 terminates the established call connection 260, the application module 220 may further generate another dial tone or announcement message to indicate to the subscriber an option to originate another call connection. As a result, the subscriber may initially establish an incoming call connection with the PBX terminal 10 using the subscriber's mobile station 90, but subsequently thereafter, a number of call connections can be repeatedly established using the same second circuit connection 250 between the PBX 30 and the service node 200 without reestablishing a radio connection with the mobile station 90.

Alternatively, another call connection between the mobile station 90 and the service node 200 may be effectuated as a result of the PBX terminal 10 and/or the PSTN terminal 20 terminating an established call connection. As an illustration, in response to the PBX terminal 10 and/or the PSTN terminal 20 terminating an associated call connection, the application module 220 may call back the mobile station 90 for further instructions. Alternatively, in response to the PSTN terminal 20 terminating the call connection 260, the mobile station 90 may further originate another mobile connection to the service node 200 while maintaining the existing second circuit connection 250 with the PBX terminal 10.

Figure 3:
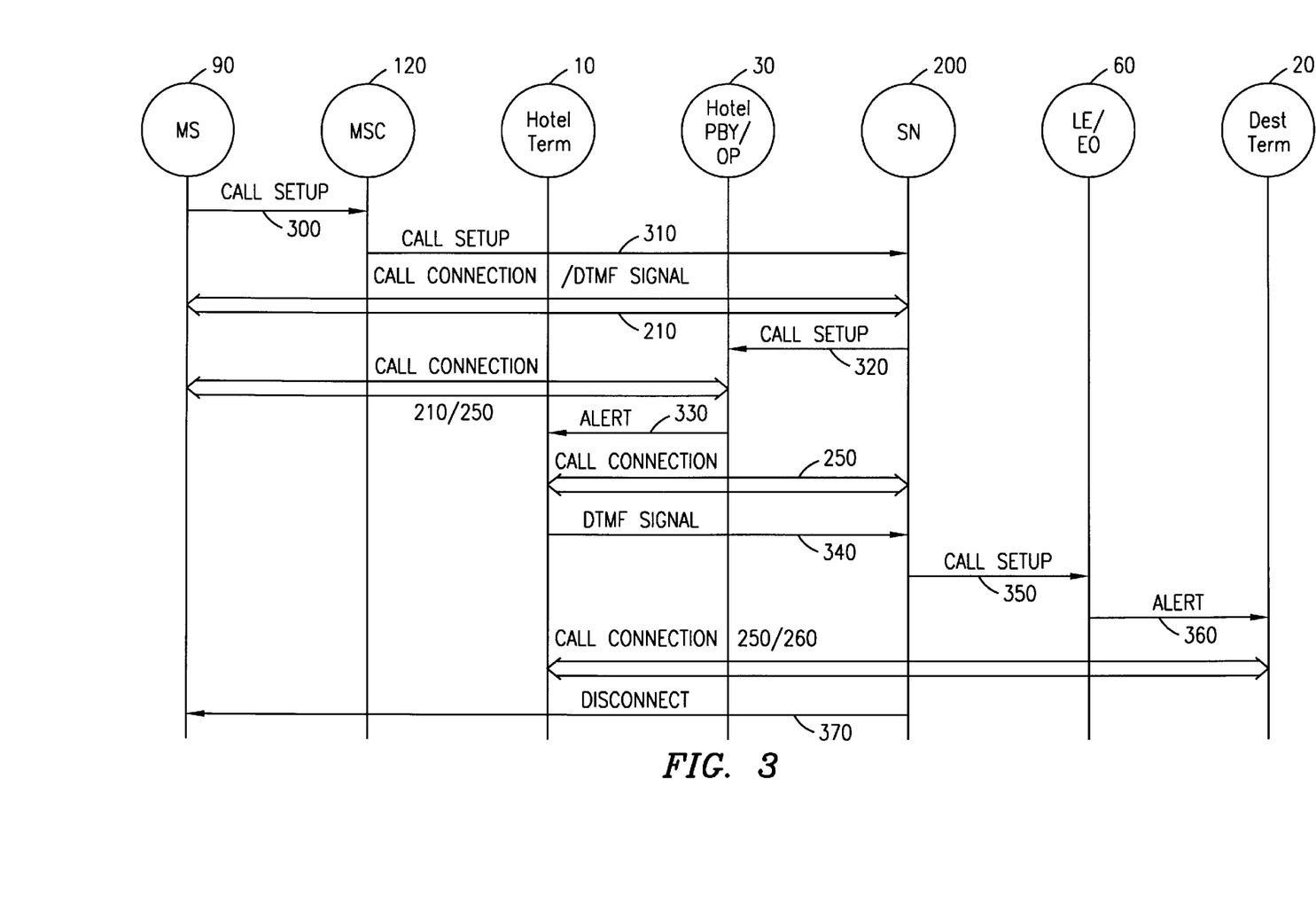
FIG. 3 is a signal sequence diagram of a telecommunication network illustrating a call connection being effectuated between a PBX terminal and a PSTN terminal in accordance with the teachings of the present invention.

FIG. 3 is a signal sequence diagram of a telecommunication network illustrating a call connection being effectuated between a PBX terminal 10 and a PSTN terminal 20 in accordance with the teachings of the present invention. A hotel guest located next to her hotel room terminal 10 originates a radio call setup signal 300 using her mobile station towards the service node 200. A radio call setup signal, such as a Direct Transfer Application Part (DTAP) signal, is transmitted by the mobile station 90 and delivered to the serving MSC 120. The serving MSC 120 then determines the calling party directory number (CgPn) associated with the mobile station and called party directory number (CdPn) associated with the service node 200. The serving MSC 120 then originates a network call setup signal, such as an Integrated Service Digital Network User Part (ISUP) based Initial Address Message (IAM) signal 310, with the determined data over a connected Signaling System No. 7 (SS7) telecommunications network. As a result, a first call connection 210 between the mobile station 90 and the service node 200 is established. The mobile station 90 then instructs the application module within the service node 200 to effectuate an outgoing call connection towards the hotel PBX 30. Accordingly, after receiving the associated hotel room directory number via DTMF signals or voice, the service node transmits another call setup signal 320 towards the PBX 30 establishing a second call connection 250 therewith. The established second call connection 250 is further connected to the first call connection 210 to enable the subscriber associated with the mobile station 90 to hear the call in progress. Assuming that the PBX 30 has no DID lines, the incoming call connection 250 is initially answered by an operator or answering system associated with the PBX 30. The hotel guest then instructs the hotel operator, for example, to forward or transfer the call to a particular hotel room terminal 10. As a result, the second call connection is forwarded and the associated hotel (PBX) terminal 10 is alerted 330 (rung). Upon answering the call, a speech connection 250 between the hotel terminal 10 and the mobile station 90 is effectuated via the service node 200. The subscriber then instructs the service node 200 to originate another outgoing call connection towards a particular called party terminal. Such an instruction 340 can be transmitted over the established second call connection 250 via DTMF signals or voice data. Alternatively, such instructions can also be transmitted over the established first call connection 210. Utilizing the provided directory number, the application module associated with the service node 200 then transmits another call setup signal 350 towards a local exchange (LE) or end office (EO) serving the indicated called party terminal 20. Upon receiving an incoming call connection request, the terminating local exchange 60 accordingly alerts the called party subscriber terminal 20 with ring signals 360. Upon answering the call, a call connection between the hotel terminal 10 and the PSTN terminal 20 is established. The service node then transmits a disconnect signal 370 to disconnect the first call connection 210 established with the MSC 120 serving the mobile station 90.

Figure 4:
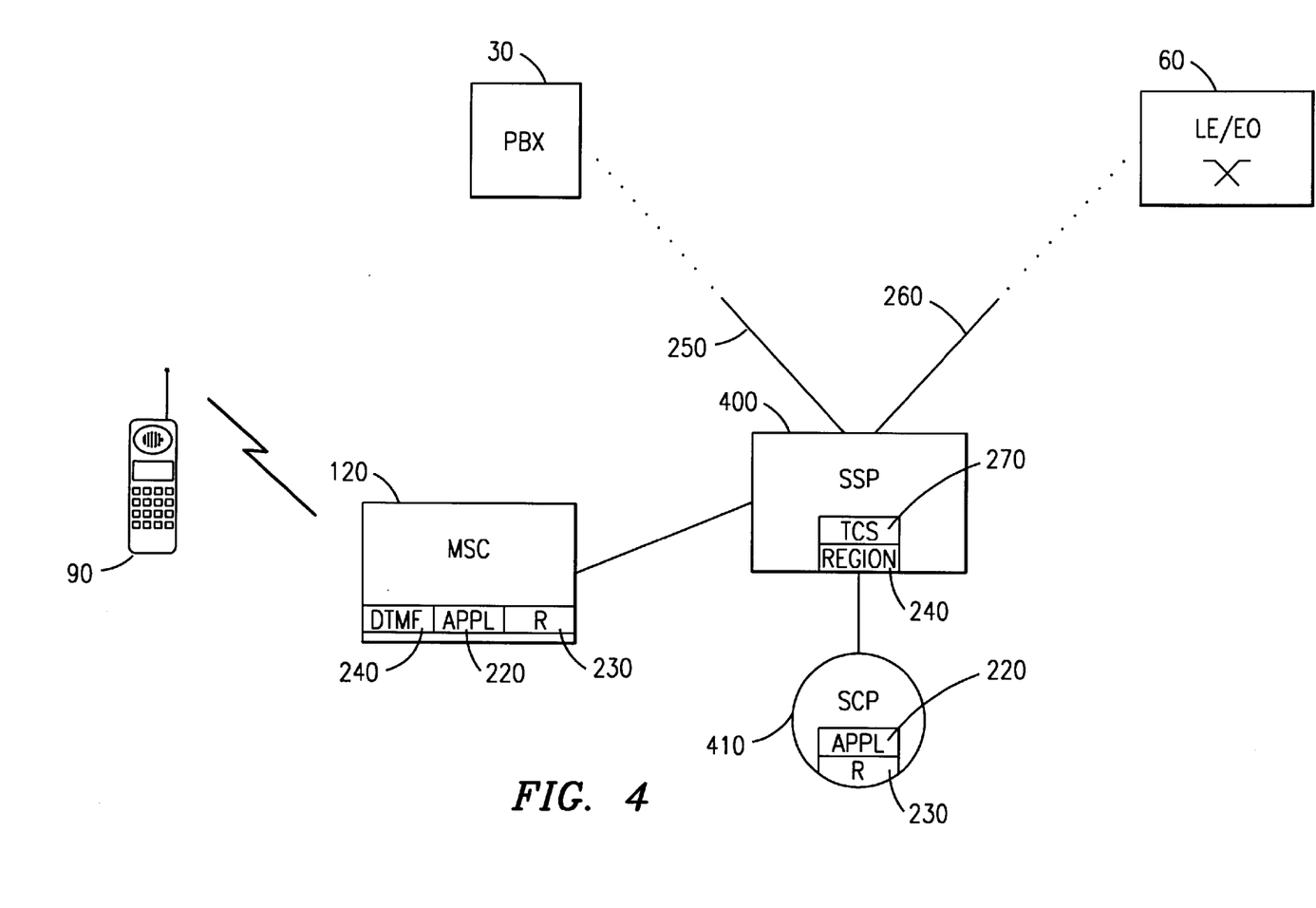
FIG. 4 is a block diagram of a telecommunications network illustrating other embodiments of the present invention.

Reference is now made to FIG. 4 illustrating an alternative embodiment of the present invention. A service node 200 as illustrated in FIG. 2 may be a conventional telecommunications node, such as an end office, local exchange, or PBX. With the introduction of Intelligent Network (IN) based telecommunications systems, the present invention may also be implemented within an IN environment. Accordingly, a service switching point (SSP) 400 is utilized to receive an incoming call connection from the serving MSC 120 and to originate outgoing call connections 250, 260 towards the PBX 30 and the terminal local exchange 60, respectively. Since the SSP 400 has no "intelligence" to process the call or to provide telecommunications services, a centralized database known as a service control point (SCP) 410 is further associated with the SSP 400. Accordingly, in response to the mobile station establishing a call connection with the SSP 400, the SSP 400 receives the instructions from the mobile station 90, for example, using a DTMF receiver 240 and forwards the received data to the SCP 410. An application module 220 and/or a register (R) 230 associated with the SCP 410 then determines the appropriate actions to be performed for the requesting subscriber in a similar manner as described above in FIGS. 2 and 3. The SCP 410 then instructs the TCS 270 associated with the serving SSP to, for example, originate call setup signals towards the PBX 30 and towards the terminating local exchange 60 as fully described above.

As another alternative to the present invention, such an application module 220, DTMF receiver 240, and register (R) 230 may also be associated with an MSC 120 serving the mobile station 90. Accordingly, without establishing a separate circuit connection between a serving MSC and a service node, the serving MSC directly originates two network call setup signals towards the PBX terminal and the called party PSTN terminal.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for establishing a call connection between a first telecommunications terminal associated with a private branch exchange (PBX) and a second telecommunications terminal associated with an end office within a telecommunications network, said PBX further associated with an operator for answering all incoming call connections thereto, said method comprising the steps of:

establishing a first call connection between a service node associated with said telecommunications network and a third telecommunications terminal, said third telecommunications terminal instructing said service node via said first call connection to establish a second call connection from said service node to said PBX;

establishing said second call connection from said service node to said PBX, connecting said first call connection with said second call connection to provide a speech connection between said third telecommunications terminal and said PBX operator, and a subscriber associated with said third telecommunications terminal verbally instructing said PBX operator via said speech connection to forward said second call connection to said first telecommunications terminal;

establishing a third call connection from said service node to said second telecommunications terminal; and connecting said second call connection with said third call connection to establish a call connection between said first telecommunications terminal and said second telecommunications terminal.

2. The method of claim 1 wherein said third telecommunications terminal comprises a mobile station.

3. The method of claim 2, wherein said step of establishing said third call connection from said service node to said second telecommunications terminal further comprises the step of receiving an indication from said mobile station over said first call connection to establish a call connection towards said second telecommunications terminal.

4. The method of claim 2, further comprising the step of disconnecting said first call connection between said service node and said mobile station in response to a successful completion of said third call connection.

5. The method of claim 1 wherein said step of establishing said third call connection from said service node to said second telecommunications terminal further comprises the step of receiving an indication from said first telecommunications terminal over said second call connection to establish a call connection towards said second telecommunications terminal.

6. The method of claim 1, further comprising the steps of:

receiving an indication over said second call connection from said first telecommunications terminal; and providing telecommunications service associated with said received indication.

7. The method of claim 6 wherein said step of providing said telecommunications service further comprises the steps of:

disconnecting said third call connection between said service node and said second telecommunications terminal; and enabling said first telecommunications terminal to originate a new call connection towards another telecommunications terminal.

8. The method of claim 1, including the service node receiving a signal from the first telecommunications terminal via the second call connection and, in response to receipt of the signal, the service node automatically disconnecting the third call connection and establishing a fourth call connection from the service node to a fourth telecommunications terminal, and the service node thereafter connecting the second call connection to the fourth call connection to establish a call connection between the first telecommunications terminal and the fourth telecommunications terminal.

9. The method of claim 1, including the service node detecting that the second telecommunications terminal has terminated the third call connection, and responsive to detection of termination of the third call connection by the second telecommunications terminal, the service node automatically indicating to the first telecommunications terminal via the second call connection an option to originate another call connection, the first telecommunications terminal indicating to the service node via the second call connection that another call connection is desired, and the service node, responsive to said indication from said first telecommunications terminal, establishing a fourth call connection to a fourth telecommunications terminal and connecting the fourth call connection to the second call connection to establish a call connection between the first telecommunications terminal and the fourth telecommunications terminal.

10. The method of claim 1, including the service node detecting that one of the first and second telecommunications terminals has terminated the associated one of the second and third call connections and, responsive to said detecting step, the service node establishing a fourth call connection to the third telecommunications terminal and requesting, via the fourth call connection, further instructions from the third telecommunications terminal.

11. A method for establishing a call connection between a first telecommunications terminal associated with a Private Branch Exchange (PBX) without Direct-Inward-Dialing (DID) capabilities and a second telecommunications terminal within a telecommunications network, said telecommunications network further comprising a service node for providing feature services, said method comprising the steps of:

establishing an incoming call connection between a third telecommunications terminal and said service node;

receiving a first indication over said established incoming call connection to originate a call connection towards said first telecommunications terminal;

establishing, in response to said first indication, a first originating call connection from said service node to said first telecommunications terminal via said PBX, including connecting said incoming call connection to said first originating call connection to permit a user of said third telecommunications terminal to directly identify said first telecommunications terminal to said PBX;

receiving a second indication to originate a call connection towards said second telecommunications terminal;

establishing, in response to said second indication, a second originating call connection from said service node to said second telecommunications terminal; and connecting said second originating call connection with said first originating call connection to establish a call connection between said first telecommunications terminal and said second telecommunications terminal.

12. The method of claim 8 wherein said step of establishing said first originating call connection from said service node to said first telecommunications terminal further comprises:

said user transmitting over said incoming call connection and said first originating call connection information instructing an operator associated with said PBX to forward said first originating call connection to said first telecommunications terminal.

13. The method of claim 11 wherein said third telecommunications terminal comprises a mobile station.

14. The method of claim 11 wherein said step of receiving said second indication comprises the step of receiving said second indication over said incoming call connection from said third telecommunications terminal.

15. The method of claim 11, further comprising the step of disconnecting said incoming call connection.

16. The method of claim 11, including terminating said second originating call connection, and thereafter:

receiving a third indication over said first originating call connection from said first telecommunications terminal to originate a new call connection towards another telecommunications terminal; and establishing, in response to said third indication, a third originating call connection from said service node to said another telecommunications terminal, and connecting said third originating call connection to said first originating call connection to establish a call connection between said first telecommunications terminal and said another telecommunications terminal.

17. A telecommunications node for establishing a call connection between a first terminal associated with a private branch exchange without Direct-Inward-Dialing (DID) capability and a second terminal associated with a local exchange (LE), comprising:

a traffic control system (TCS) for receiving an incoming call connection from a third terminal; and an application module coupled to said TCS for:

receiving a first indication to originate a first originating call connection from said telecommunications node to said PBX;

instructing said TCS, in response to said first indication, to establish said first originating call connection with said PBX and to connect said incoming call connection to said first originating call connection thereby to permit a user of said third terminal to transmit directly to said PBX a second indication instructing said PBX to forward said first originating call connection to said first terminal;

receiving a third indication to originate a second originating call connection from said telecommunications node to said second terminal;

instructing said TCS, in response to said third indication, to establish said second originating call connection towards said second terminal; and instructing said TCS to connect said first originating call connection with said second originating call connection to establish a call connection between said first terminal and second terminal.

18. The telecommunications node of claim 17, wherein said first indication is received from said third terminal over said received incoming call connection.

19. The telecommunications node of claim 17, wherein said third indication is received from said third terminal over said received incoming call connection.

20. The telecommunications node of claim 17, wherein said third indication is received from said first terminal over said first originating call connection.

21. The telecommunications node of claim 17, wherein said third terminal comprises a mobile station.

22. The telecommunications node of claim 17, further comprising a dual tone multi frequency (DTMF) detector for analyzing said received first and third indications.

23. A method for establishing a call connection between a first telecommunications terminal associated with a private branch exchange (PBX) and a second telecommunications terminal associated with an end office within a telecommunications network, said PBX further associated with an operator for answering all incoming call connections thereto, said method comprising the steps of:

establishing a first call connection between a service node associated with said telecommunications network and a third telecommunications terminal, said third telecommunications terminal instructing said service node via said first call connection to establish a second call connection from said service node to said PBX;

establishing said second call connection from said service node to said PBX, connecting said first call connection with said second call connection to provide a speech connection between said third telecommunications terminal and said PBX operator, and a subscriber associated with said third telecommunications terminal verbally instructing said PBX operator via said speech connection to forward said second call connection to said first telecommunications terminal;

establishing a third call connection from said service node to said second telecommunications terminal;

connecting said second call connection with said third call connection to establish a call connection between said first telecommunications terminal and said second telecommunications terminal;

the service node receiving a signal from the first telecommunications terminal via the second call connection and, in response to receipt of the signal, the service node automatically disconnecting the third call connection and establishing a fourth call connection from the service node to a fourth telecommunications terminal, and the service node further connecting the second call connection to the fourth call connection to establish a call connection between the first telecommunications terminal and the fourth telecommunications terminal;

the service node detecting that the fourth telecommunications terminal has terminated the fourth call connection, and the service node, responsive to said detecting step, indicating to the first telecommunications terminal via the second call connection an option to originate another call connection, the first telecommunications terminal indicating to the service node via the second call connection that another call connection is desired, and the service node, responsive to said indicating step, establishing a fifth call connection to a fifth telecommunications terminal, and the service node further connecting the fifth call connection to the second call connection to establish a call connection between the first telecommunications terminal and the fifth telecommunications terminal; and the service node detecting that one of the first and fifth telecommunications terminals has terminated the associated one of the second and fifth call connections, and responsive to said last-mentioned detecting step, the service node establishing a sixth call connection to the third telecommunications terminal, and the service node requesting, via the sixth call connection, further instructions from the third telecommunications terminal.

* * * * *